Inventor
William W. Sloane
Clarence F. Poole
Attorney

Patented Feb. 11, 1936

2,030,330

UNITED STATES PATENT OFFICE 2,030,330

DRIVE MECHANISM FOR SHAKER CONVEYERS

William W. Sloane, Chicago, Ill., assignor to Goodman Manufacturing Company, Chicago, Ill., a corporation of Illinois Application August 16, 1933, Serial No. 685,427
Renewed June 27, 1935

10 Claims. (Cl. 74—26)

This invention relates to improvements in drive mechanisms for shaker conveyers of the type utilized for conveying loose material, such as coal, and has as its principal objects to provide an improved construction and arrangement of the shaker drive whereby means are provided in the drive motor for moderating the fluctuations of speed and load of the motor during the driving operation, and whereby a plurality of power transmission devices are interposed between the drive motor and a conveyer trough or pan line for transposing the rotary motion of said motor into rectilinear motion having predetermined changes in acceleration during various parts of the stroke for moving material along the conveyer pan line in a most efficient manner.

The cycle of motion of a reciprocating conveyer is divided into four parts; that is, acceleration and deceleration of the forward stroke, and acceleration and deceleration of the return stroke. In two parts of the cycle the motor accelerates the pan line and in the other two parts the pan line is decelerated and tends to drive the motor. This causes a difference in power demands which will reach a maximum peak of more than twice the average power demand and a minimum value that is negative.

Shaker conveyer drives having no means for moderating this fluctuation in power demand of the motor have three inherent disadvantages which are as follows:

1. The variations in speed of the motor due to the varying loads thereon modify the motion of the drive so it is not as effective as where a means is provided for modifying these variations in speed and loads on the motor.

2. The maximum stress on the pan line comes at one of the points of reversal thereof, which is at the point where the motor speed is at a maximum, and inasmuch as the stresses are in proportion to the square of the speed, the maximum stresses are increased.

3. The heating effect of the motor is proportional to the square of the current passing through it. For fluctuating loads, the mean square of the current greatly exceeds the average current demand. This means that the motor will heat up more from such an intermittent load than from a constant load of the same average horsepower.

The device of my invention utilizes a means for reducing the speed fluctuations to a small amount with the result that the motion of the conveyer drive is more effective, the maximum stresses on the pan line are decreased, and heating of the motor is reduced.

Other objects of my invention will appear from time to time as the following specification proceeds.

My invention may be more clearly understood with reference to the accompanying drawing wherein.

Like numerals refer to like parts throughout the various figures.

Figure 1:
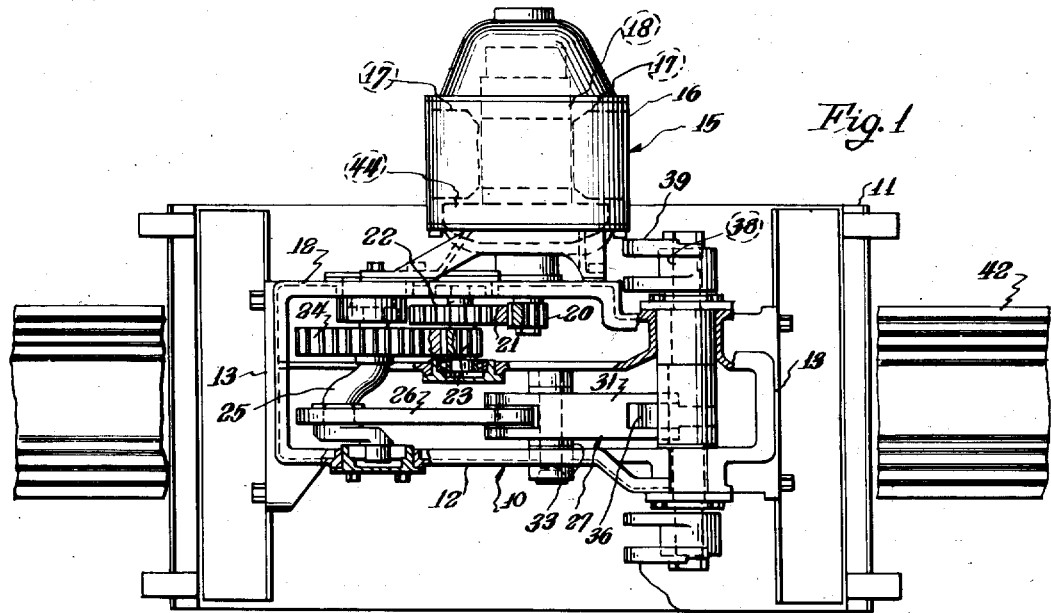
Figure 1 is a top plan view of one device embodying my invention with the top cover of the casing removed and parts broken away and in section to more clearly show the details thereof.
Figure 2:
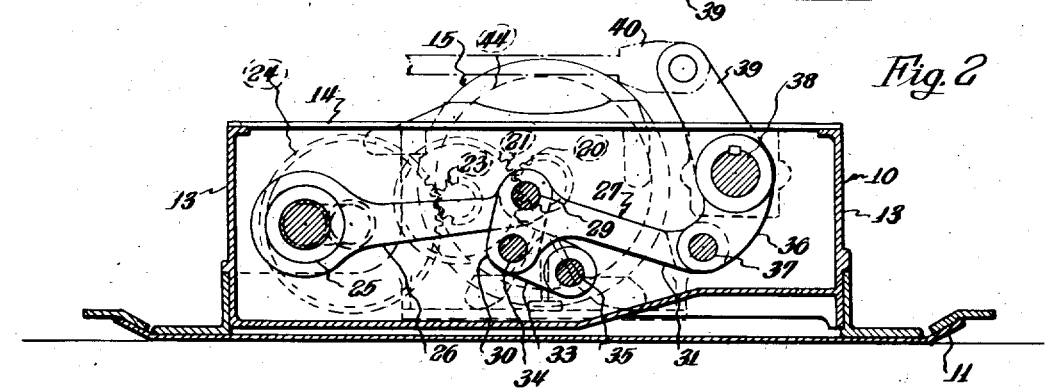
Figure 2 is a side elevation of the device shown in Figure 1 with parts shown in vertical longitudinal section.
Figure 3:
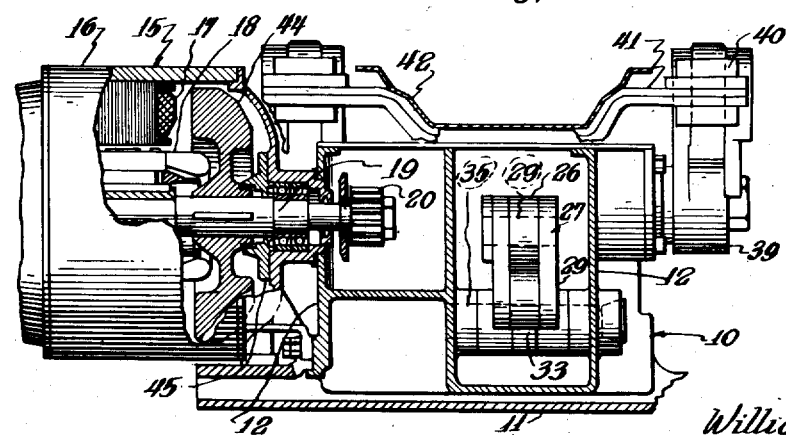
Figure 3 is a detail transverse sectional view of the device shown in Figure 1 showing several other details than are shown in Figures 1 and 2.

Referring now to the details of the embodiment of my invention illustrated in the drawing, my improved form of drive consists of a casing 10 which is adapted to rest on and be supported by a flexible bed plate 11 in a suitable manner. The flexible bed plate 11 is adapted to rest on the mine floor and be suitably secured thereto when the drive is in operation by holding jacks (not shown) or the like, in the usual manner. The casing 10 consists of side walls 12, end walls 13, suitable bearing support means carried therein for supporting the conveyer drive mechanism and a cover 14 for enclosing the drive.

A motor 15 is mounted on one of the side walls 12 of the casing 10 in a suitable manner; as, for instance, studs and nuts, and forms a drive means for the conveyer drive mechanism. The motor 15 is herein shown as being an electric motor and consists of a casing 16, field coils 17, and an armature 18 carried on an armature shaft 19, which armature shaft in turn is journaled within said casing in a suitable manner for rotation with respect to said casing.

An armature pinion 20 is secured to an end of the armature shaft 19 within the casing 10, and meshes with and drives a spur gear 21 on a shaft 22. The shaft 22 is journaled within the casing 10 in a suitable manner and has a pinion 23 secured thereto adjacent the spur gear 21. The pinion 23 meshes with and drives a spur gear 24 keyed to a crank 25, which crank is journaled adjacent its ends on anti-friction bearings carried by opposite side walls 12, 12 of the casing 10.

A connecting rod 26 is connected adjacent one of its ends to the crank 25 in a suitable manner and is pivotally connected to a forked end of a connecting member 27 adjacent its opposite end by means of a pivotal pin 29. The connecting member 27 includes a depending bifurcated arm 30 and a longitudinally extending arm 31. The depending arm 30 is pivotally connected to a rocking member 33 by means of a pivotal pin 34, which rocking member in turn is pivotally mounted in the lower portion of the casing 10 on a shaft 35.

The axis of pivotal connection of the connecting member 27 to the rocking member 33 is spaced downwardly from the axis of pivotal connection of the connecting rod 26 to said connecting member a distance sufficient to permit free movement of said connecting rod with respect to the rocking member 33 and produce the required driving effect, which distance is determined mathematically in a manner which need not herein be described. The free end of the longitudinally extending arm 31 of the connecting member 27 is pivotally connected to a rocking member 36 by means of a pivotal pin 37. The rocking member 36 is keyed to a shaft 38 journaled in the casing 10 and extending beyond the side walls 12, 12.

The shaft 38 is so located in the casing 10, with respect to the shaft 35 and rocking member 33, that the axis of pivotal movement of the rocking member 36 is on the opposite side of the longitudinal axis of the connecting member 27 from the axis of pivotal movement of the rocking member 33. The purpose of this particular arrangement of the parts of the drive mechanism has been fully explained in a prior application Serial No. 644,666, filed by me on November 11, 1932, which issued as Patent No. 2,026,103, Dec. 31, 1935, so need not herein be described in detail.

Lever arms 39, 39, having forked ends, are secured to opposite ends of the transverse shaft 38 on the outer sides of the casing 10 and are adapted to have connecting rods 40, 40 pivotally connected thereto in a suitable manner. The connecting rods 40, 40 are connected at their free ends with a drive member 41, which drive member is in turn operatively connected with a shaker conveyer pan or trough 42 for reciprocating said trough upon rotation of the crank 25 in the usual manner.

It may now be seen that the connecting member 27 simplifies the shaker drive mechanism and reduces the number of parts over the drive mechanism shown and described in my aforementioned prior application, and effects a drive wherein a more simplified drive than formerly has been provided of a compact construction, which mechanism is so arranged as to cause the acceleration of the forward stroke and the deceleration of the forward stroke and acceleration of the return stroke to be as uniform as possible for any given ratio between the average forward and backward forces of acceleration and deceleration and thus provide a conveying mechanism which will move material along a pan line in a most efficient manner without imparting unduly heavy strains on the parts of the mechanism, and that this mechanism is of a compact arrangement permitting the rocking and rotating members to move in vertical planes and still maintain the proportions of the drive to a minimum, which drive has all the advantages of bulkier and more complicated drive mechanisms.

Referring now in particular to another novel feature of my invention and the means for increasing the efficiency of the drive motion over other drive motions and keeping down the maximum stresses of the drive and heating of the motor to a minimum and still retaining the compact features of the drive, a means is provided within the casing 16 of the motor 15 for moderating fluctuations in speed and load of the motor, which is herein shown as being a flywheel 44 keyed to the armature shaft 19 on the pinion side of the armature 18. The flywheel 44 is herein shown as being of a larger diameter than the diameter of the armature 18 and is carried by the armature shaft 19 between the bearings for rotatably supporting said armature shaft. The flywheel 44 is recessed on one side to permit the armature coils to be recessed therein, and on the opposite side to permit a bearing and oil retaining member 45 to be recessed therein and thus keep down the length of the casing to a minimum.

Flywheels have heretofore been incorporated in shaker conveyer drives, but these flywheels have heretofore been directly connected to the crank for translating the rotary motion of the motor into rectilinear motion in advance of the drive gearing from the motor to the crank. Due to the interposition of the flywheel between the gears and the motor, the losses and stepping up effect of the gears does not modify the fluctuations of load and speed of the motor in the desired manner, and such an arrangement, in order to be efficient, has heretofore increased the size of the drive to an undesirable extent.

With the arrangement herein shown as being a part of my invention, the flywheel 44 is located within the casing between the motor bearings in such a manner that its entire mass will be effective in modifying fluctuations in speed and load of the motor caused by the reciprocating conveyer drive mechanism, and said flywheel is so arranged as not to materially increase the size of the motor or conveyer drive mechanism.

While I have herein shown and described one form in which my invention may be embodied, it will be understood that the construction and arrangement of the parts may be altered without departing from the spirit and scope of my invention. I do not, therefore, wish to be understood as limiting myself to the specific construction illustrated herein excepting as specifically limited in the appended claims.

I claim as my invention:

1. In a shaker conveyer drive, a motor, a reciprocable driven member, and means for transposing the rotary motion of said motor into rectilinear motion having predetermined changes in acceleration during various parts of the stroke comprising a crank, a connecting rod connected thereto a rocking member movable about a fixed axis spaced longitudinally from the axis of pivotal movement of said crank, a second rocking member movable about a fixed axis progressively spaced longitudinally from the axis of said crank and first-mentioned rocking member, a connection from said second rocking member to said reciprocable driven member and means for connecting said connecting rod with each of said rocking members comprising a single member having pivotal connection with each of said members.

2. A shaker conveyer drive in accordance with claim 1 wherein the single member has pivotal connection with each of said members at spaced apart axes.

3. A shaker conveyer drive in accordance with claim 1 wherein the single member is disposed between the axes of pivotal movement of said rocking members and wherein said member has connection with said connecting rod and rocking members at spaced apart axes.

4. In a shaker conveyer operating mechanism, the combination with a reciprocable driven trough, of a crank, of two devices reciprocably movable about spaced apart pivotal axes, mechanism connecting one of said devices to said driven member, a connecting member connecting said two devices together, and a connection from said crank to said connecting member at a point spaced from the axes of pivotal connection of said connecting member to said rocking devices.

5. A shaker conveyer operating mechanism in accordance with claim 4 wherein the connecting member is spaced between the axes of pivotal movement of said rocking devices.

6. In a shaker conveyer operating mechanism, the combination with a reciprocable driven member, of a crank, of two rocking members pivotally movable about spaced apart pivotal axes, mechanism connecting one of said devices to said driven member, a connecting rod connected to said crank, and a connecting member connecting said connecting rod and rocking members together at spaced apart pivotal axes.

7. A shaker conveyor operating mechanism in accordance with claim 6 wherein the connecting rod is connected to the connecting member at a point spaced above the axis of pivotal connection of the connecting member to the first rocking member.

8. A shaker conveyer operating mechanism in accordance with claim 6 wherein the connecting rod is connected to the connecting member at a point spaced above the axis of pivotal connection of the connecting member to the first rocking member, and wherein the longitudinal axis of the connecting member is intermediate the axes of pivotal movement of the rocking members.

9. In an apparatus of the class described, a reciprocably driven conveyer trough, means for reciprocably driving said conveyer trough comprising a rotating member and means for transferring rotational movement of said rotating member to translational movement having a predetermined variable acceleration, a casing enclosing said drive means, means for driving said rotating member comprising a motor including a motor casing secured to and having a motor shaft extending within said first-mentioned casing, and means carried within said motor casing and between the bearings of said motor shaft for moderating fluctuations in speed and load of said motor and reducing stresses and load on said drive upon reciprocation of said trough comprising a flywheel on said motor shaft adjacent said drive mechanism.

10. In an apparatus of the class described, a reciprocably driven conveyer trough, means for reciprocably driving said conveyer trough comprising a rotating member and means for transferring rotational movement of said rotating member to translational movement having a predetermined variable acceleration, a casing enclosing said drive means, means for driving said rotating member comprising a motor including a motor casing secured to and having a motor shaft extending within said first-mentioned casing, an armature on said motor shaft, and means carried within said motor casing and between the bearings of said motor shaft for moderating fluctuations in speed and load of said motor and reducing stresses and load on said drive upon reciprocation of said trough comprising a flywheel on said motor shaft of larger diameter than said armature.

WILLIAM W. SLOANE.